United States Patent
Reichman et al.

(12) 
(10) Patent No.: US 6,569,567 B1
(45) Date of Patent: May 27, 2003

(54) METHOD OF ACTIVATING METAL HYDRIDE MATERIAL AND ELECTRODE

(75) Inventors: Benjamin Reichman, West Bloomfield, MI (US); William Mays, Livonia, MI (US); Michael A. Fetcenko, Rochester Hills, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/395,391

(22) Filed: Sep. 13, 1999

(51) Int. Cl.$^7$ ................................................ H01M 4/04

(52) U.S. Cl. ........................ 429/218.2; 429/59; 420/500

(58) Field of Search ............................ 420/900; 429/59, 429/218.2

(56) References Cited

U.S. PATENT DOCUMENTS

| | | | |
|---|---|---|---|
| 4,716,088 A | | 12/1987 | Reichman |
| 5,858,571 A | * | 1/1999 | Ishii et al. ..................... 429/59 |
| 5,879,429 A | * | 3/1999 | Yamamura et al. ..... 420/900 X |
| 6,132,639 A | * | 10/2000 | Komatsu et al. ........ 429/223 X |

* cited by examiner

*Primary Examiner*—John S. Maples
(74) *Attorney, Agent, or Firm*—Philip H. Schlazer; Marvin S. Siskind (57) ABSTRACT

A method of activating a hydrogen storage alloy or a hydrogen storage alloy electrode. The method includes the step of contacting the hydrogen storage alloy or hydrogen storage alloy electrode with an aqueous solution of an alkali metal hydroxide where the concentration of the alkali metal hydroxide is at least about 40 weight percent. The method produces a hydrogen storage alloy and hydrogen storage alloy electrode with increased surface area.

40 Claims, 3 Drawing Sheets

METHOD OF ACTIVATING METAL HYDRIDE MATERIAL AND ELECTRODE

FIELD OF THE INVENTION

The present invention relates to rechargeable hydrogen storage electrochemical cells. More particularly, the invention relates to a method of activating hydrogen storage alloy materials and hydrogen storage alloy electrodes.

BACKGROUND OF THE INVENTION

Rechargeable electrochemical cells using a hydrogen storage alloy as the active material for the negative electrode are known in the art. The negative electrode is capable of the reversible electrochemical storage of hydrogen. The positive electrode typically comprises a nickel hydroxide active material although other active materials, such as manganese hydroxide, may be used. The negative and positive electrodes are spaced apart in an alkaline electrolyte. A suitable separator (i.e., a membrane) may also be positioned between the electrodes. As used herein the terminology "metal hydride material", "hydrogen storage alloy", and "hydrogen absorbing alloy" are synonymous.

Upon application of an electrical current to the negative electrode, the active metal hydride material is charged by the absorption of hydrogen. This is shown by reaction (1).

$$M + H_2O + e^- \rightarrow M\text{-}H + OH^- \text{ (Charging)} \qquad (1)$$

Upon discharge, the stored hydrogen is released by the metal hydride material to provide an electric current. This is shown by reaction (2).

$$M\text{-}H + OH^- \rightarrow M + H_2O + e^- \text{ (Discharging)} \qquad (2)$$

The reactions at a conventional nickel hydroxide positive electrode as utilized in a nickel-metal hydride electrochemical cell are as follows:

$$Ni(OH)_2 + OH^- \rightarrow NiOOH + H_2O + e^- \text{ (Charging)} \qquad (3)$$

$$NiOOH + H_2O + e^- \rightarrow Ni(OH)_2 + OH^- \text{ (Discharging)} \qquad (4)$$

Based on the pioneering principles of Stanford R. Ovshinsky, a family of extremely efficient electrochemical hydrogen storage materials were formulated. These are the Ti—V—Zr—Ni type active materials such as those disclosed in U.S. Pat. No. 4,551,400 ("the '400 Patent") the disclosure of which is incorporated herein by reference. These materials reversibly form hydrides in order to store hydrogen. All the materials used in the '400 Patent utilize a generic Ti—V—Ni composition, where at least Ti, V, and Ni are present with at least one or more of Cr, Zr, and Al.

Other examples of metal hydride alloys are provided in U.S. Pat. No. 4,728,586 ("the '586 Patent") the disclosure of which is incorporated herein by reference. The '586 Patent describes a specific sub-class of these Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Still other examples of hydrogen absorbing alloys are provided in U.S. Pat. No. 5,536,591 ("the '591 Patent"), the disclosure of which is incorporated herein by reference. In particular, the '591 Patent provides teaching on the type of surface interface at the metal hydride electrode and the nature of catalytic sites ideal for promoting high rate discharge.

In part, due to the research into the negative electrode active materials, the Ovonic nickel-metal hydride batteries have demonstrated excellent performance characteristics such as power, capacity, charging efficiency, rate capability and cycle life. Presently, there is an increasing use of rechargeable nickel-metal hydride batteries in all types of portable tools, appliances, and computer devices. As well, there is a growing use of nickel-metal hydride cells in applications such as electric and hybrid-electric vehicles. Many of the new uses for the nickel-metal hydride cells require that further improvements be made in the cell's performance.

Many of the performance characteristics of a nickel-metal hydride cell are affected by the surface conditions of the active metal hydride material used in the cell's negative electrode. For example, the power of the cell is affected by both the surface composition and the surface area of the metal hydride material. The appropriate modification of the surface composition and/or the surface area can change the surface kinetics of the hydride reaction so as to lower the charge transfer resistance of the material.

Hydrogen storage alloys are sensitive to the formation of oxides and the alloy surfaces comprise, to a great extent, metal oxides. The composition of these oxides depends on many factors including the composition, morphology and method of preparation of the hydrogen storage alloy. Generally, the type of surface oxides which form naturally and not by design may be detrimental to the performance of the negative electrode and cell. Oxides at the surface of the hydrogen absorbing alloy decreases the alloy's catalytic (charge transfer) capabilities, thereby decreasing both the charging and discharging efficiency of the electrode and cell.

During cell charging, the decreased surface kinetics of the alloy shifts the potential at the surface of the electrode so as to increase the evolution of hydrogen gas via the hydrogen evolution reaction:

$$2H_2O + 2e^- \rightarrow H_2 + 2OH^- \qquad (5)$$

Atomic hydrogen formed at the surface of the negative electrode can either recombine with another atomic hydrogen and escape as molecular hydrogen gas or it can react with the hydrogen absorbing alloy in the electrode to form a hydride. If the surface of the hydrogen absorbing alloy is covered with oxides, hydride formation is inhibited and hydrogen evolution is preferred. Electric current (e.g., electrons) applied to the negative electrode for the purpose of charging the electrode via charging reaction (1) is instead "wasted" in the production of hydrogen gas via reaction (5). This decreases the charging efficiency of the cell and increases the pressure of hydrogen gas within the cell. The decreased surface kinetics also increases the charge transfer resistance of the material and the electrode so that more power is wasted due to internal dissipation. It is also believed that the surface oxides polarize the electrode so as to reduce the rate at which the cell discharge process proceeds.

Many of the surface oxides are very dense and impermeable to hydrogen transfer thereby increasing the resistance to hydrogen diffusion during both the charging and discharging processes. This has a detrimental effect on the rate capability of the electrode.

U.S. Pat. No. 4,716,088, the contents of which is incorporated by reference herein, describes a method of "activating" the hydrogen storage alloy material by immersing the material into a alkaline solution. This "alkaline etch treatment" modifies the composition and morphology of the alloy surface so as to improve the electrochemical activity of the alloy and the electrodes formed from the alloy.

The activation process modifies the composition of the oxide layer on the surface of the alloy. The oxide composition depends upon the composition of the underlying hydrogen storage alloy as well as the corrosivity of the different metals which form the alloy. Certain metals such as titanium, zirconium and manganese have a greater affinity for oxidation while other metals such as nickel do not oxidize as readily. Oxide composition may also depend upon the specific process used to make the alloy since certain processes may promote oxidation more than others.

It is believed that immersing the hydrogen storage alloy into the alkaline solution at least partially dissolves certain oxides from the alloy surface. The extent of dissolution depends upon the solubility of the specific oxide in the alkaline environment. Certain oxides, such as oxides of manganese, vanadium, aluminum and cobalt are readily soluble in an alkaline solution while others, such as those of titanium, zirconium and nickel are less soluble.

The alkaline etch treatment modifies the oxide composition of the alloy surface so as to increase the catalytic activity (charge transfer capabilities) of the material. While not wishing to be bound by theory, it is believed that the activation process increases the concentration of nickel metal at or near the alloy's surface. Increasing the catalytic activity of the alloy surface lowers the charge transfer resistance of the material and electrode. The lowered resistance results in more efficient battery discharge since there is less power wasted due to internal dissipation and more power available for battery output. The lowered resistance also increases the charging efficiency of the cell since it shifts the voltage on the surface of the negative electrode away from the hydrogen evolution potential.

Activation also provides for a "gradual transitioning" in the composition and/or oxidation state of the oxide layer from the electrolyte/oxide interface to the bulk material. For example, the oxide layer after activation may have a small concentration of soluble components near the electrolyte interface but a composition more closely resembling the bulk material further away from the interface. This "gradient-type" surface may have an electrical and catalytic nature which is more suitable for electrochemical charging and discharging.

The activation process disclosed in the '088 Patent describes an alkaline etch treatment wherein the temperature of the alkaline solution as well as the time in which the hydrogen storage alloy is left in contact with the alkaline solution are both variables that affect the results of the process. The present invention describes an alkaline etch treatment of a hydrogen absorbing alloy and an alkaline etch treatment of a hydrogen absorbing alloy electrode wherein the concentration of the alkaline solution is also a result-effective variable which can be varied to provide an activated hydrogen storage alloy and an activated hydrogen storage alloy electrode with increased surface area and improved electrochemical properties.

SUMMARY OF THE INVENTION

One objective of the present invention is an improved method of activating a hydrogen storage alloy and/or a hydrogen storage alloy electrode. Another objective of the present invention is a hydrogen storage alloy with increased surface area. Yet another object of the present invention is a hydrogen storage alloy electrode with decreased internal resistance and increased output power. Yet another objective of the present invention is a hydrogen storage alloy electrode with improved rate capability.

These and other objectives are satisfied by a method of activating a hydrogen storage alloy, comprising the step of: contacting the hydrogen storage alloy with an aqueous solution of an alkali metal hydroxide having a concentration of at least about 40 weight percent.

These and other objectives are also satisfied by a method of activating a hydrogen storage alloy electrode for an alkaline electrochemical cell, comprising: contacting the electrode with an aqueous solution of an alkali metal hydroxide having a concentration of at least about 40 weight percent.

These and other objectives are also satisfied by hydrogen storage alloy having a surface area of at least 4 square meter per gram achieved without electrochemical cycling.

These and other objectives are also satisfied by a hydrogen storage alloy electrode, comprising: a hydrogen storage alloy affixed to a conductive substrate, the electrode having a surface area of at least 4 square meter per gram achieved without electrochemical cycling.

These and other objectives are also satisfied by a process for making a hydrogen absorbing alloy electrode, comprising the steps of: contacting a hydrogen absorbing alloy with an aqueous solution of an alkali metal hydroxide having a concentration of at least about 40 weight percent; and affixing the hydrogen absorbing alloy onto a conductive substrate.

These and other objectives are also satisfied by a process for making a hydrogen absorbing alloy electrode, comprising the steps of: affixing a hydrogen absorbing alloy onto a conductive substrate to form an unactivated electrode; and contacting the unactivated electrode with an aqueous solution of an alkali metal hydroxide having a concentration of at least 40 weight percent.

DETAILED DESCRIPTION OF THE INVENTION

Disclosed herein is a method of activating a hydrogen storage alloy and a method of activating a hydrogen absorbing alloy electrode. The activation methods of the present invention are referred to "alkaline etch treatments" whereby a hydrogen absorbing alloy material or a hydrogen absorbing alloy electrode (comprising said material) is contacted with an alkaline solution. Preferably, the alkaline solution is a highly concentrated aqueous solution of an alkali metal hydroxide.

First, a method of activating a hydrogen absorbing alloy is described. Generally, the method of activation comprises the step of contacting the hydrogen storage alloy with an alkaline solution. Preferably, the alkaline solution is an aqueous solution of an alkali metal hydroxide where the concentration of the alkali metal hydroxide is at least about 40 weight percent. The hydrogen storage alloy may be "contacted" with the alkaline solution by immersing the hydrogen storage alloy into a container of the alkaline solution. The hydrogen storage alloy may be in the form of a powder.

After the hydrogen absorbing alloy is contacted with the alkaline solution for a sufficient time (a "sufficient" time is preferably a time sufficient to alter the surface oxides so as to increase the surface kinetics of the hydrogen absorbing alloy material), the hydrogen absorbing alloy may be separated from the alkaline solution (for example, by filtration), washed (for example, with deionized water) and dried. The material may then be affixed to a conductive substrate to form a hydrogen storage alloy electrode. The substrate may be any conductive support for the hydrogen absorbing alloy material. Examples of substrates include expanded metal, screen, mesh, foil, foam, and plate. The substrates may be formed from conductive materials such as nickel or a nickel alloy, and copper or a copper alloy. The material may be affixed to the substrate by compaction, such as by one or more rolling mills. Alternatively, the material may be pasted onto the substrate. The electrode may be used as the negative electrode in an alkaline electrochemical cell such as a nickel-metal hydride electrochemical cell.

Also disclosed herein is a method of activating a hydrogen storage alloy electrode. A hydrogen storage alloy electrode comprises a hydrogen storage alloy as the active electrode material. The hydrogen storage alloy electrode may be formed by affixing a hydrogen storage alloy powder onto a conductive substrate. As discussed, the hydrogen storage alloy powder may be affixed to the substrate by methods such as compaction or pasting. The method of activating a hydrogen storage alloy electrode comprises the step of contacting the electrode with an alkaline solution. Preferably, the alkaline solution is an aqueous solution of an alkali metal hydroxide where the concentration of the alkali metal hydroxide is at least about 40 weight percent.

The contacting step is preferably done prior to sealing the electrode inside an electrochemical cell. For example, the electrode may be "contacted" with the alkaline solution by immersing the electrode into a container of the alkaline solution. After the electrode is contacted with the alkaline solution for a sufficient period of time (a "sufficient time is preferably a period of time sufficient to alter the surface oxides so as to increase the surface kinetics of the hydrogen absorbing alloy electrode), the electrode is removed from the alkaline solution. It may then be washed (for example, with deionized water) and then dried. It may then be used as an electrode for an electrochemical cell (preferably as a negative electrode for an alkaline electrochemical cell such as a nickel-metal hydride electrochemical cell).

The contacting step may also be done after the electrode is sealed inside the electrochemical cell. For example, the electrode may first be sealed inside an electrochemical cell and then be activated by an alkaline solution inside the cell.

The alkaline solution used to activate the hydrogen absorbing alloy and/or the hydrogen absorbing alloy electrode is a "concentrated" alkaline solution which is preferably an aqueous solution of an alkali metal hydroxide having a concentration which is at least about 40 weight percent. Preferably, the concentration of the alkali metal hydroxide is between about 40 weight percent and about 70 weight percent. More preferably, the concentration of the alkali metal hydroxide is between about 50 weight percent and about 70 weight percent. Most preferably, the concentration of the alkali metal hydroxide is between about 55 weight percent and about 65 weight percent. It is noted that the alkaline solution preferably has an alkali metal hydroxide concentration which is greater than the concentration which will dissolve in water at room temperature. Such highly concentrated alkaline solutions are not typically available commercially as "off-the-shelf" products. Instead, they must be made by dissolving a solid alkali metal hydroxide into a container of heated water.

Examples of alkali metal hydroxides which may be used include potassium hydroxide (KOH), sodium hydroxide (NaOH), and lithium hydroxide (LiOH). Mixtures of potassium hydroxide, sodium hydroxide, and lithium hydroxide may also be used. Preferably, the alkali metal hydroxide is potassium hydroxide.

In addition to the concentration of the alkali metal hydroxide, the results of the activation process are also dependent upon the temperature of the alkaline solution as well as the time in which the alkaline solution is permitted to contact the hydrogen absorbing alloy material. The actual temperature and time conditions used in the activation process depends upon many factors. Examples of such factors include oxide composition, oxide concentration, the composition of the hydrogen absorbing alloy material being etched, the composition of the hydrogen absorbing alloy electrode being etched, the composition of the alkali metal hydroxide used, and the concentration of the alkali metal hydroxide used in the alkaline solution. Typically, a higher concentration of the alkali metal hydroxide requires a higher temperature to ensure adequate solubility of the alkali metal hydroxide in the aqueous solution. With concentrations of the alkali metal hydroxide of at least 40 weight percent, the temperature of the alkaline solution is preferably at least about 60° C., more preferably at least about 80° C., and most preferably at least about 100° C. An additional preferable range is between 105° C. and 155° C. The time of activation is preferably a time which is sufficient to alter the surface oxides so as to increase the surface kinetics of the hydrogen absorbing alloy and/or the hydrogen absorbing alloy electrode. The time of activation may be between about one hour and about five hours.

As discussed above, the '088 Patent describes an alkaline etch treatment process wherein the temperature of the alkaline solution as well as the time period in which the alloy or electrode is left in contact with the alkaline solution are both variables which affect the electrochemical behavior of the alloy and/or electrode. The alkaline etch treatments of the present invention are distinguishable from what is described in the '088 Patent. The present inventors have discovered that the alkali metal hydroxide concentration of the alkaline solution is also a result-effective variable which may be modified to remarkably and unexpectedly improve the activation processes. In particular, the instant inventors have discovered that an alkaline etch treatment using an alkali metal hydroxide concentration of at least about 40 weight percent provides for an unexpected increase in the surface area of the hydrogen storage alloy and/or the hydrogen storage electrode beyond that which can be achieved through variations in time and temperature alone.

Figure 1:
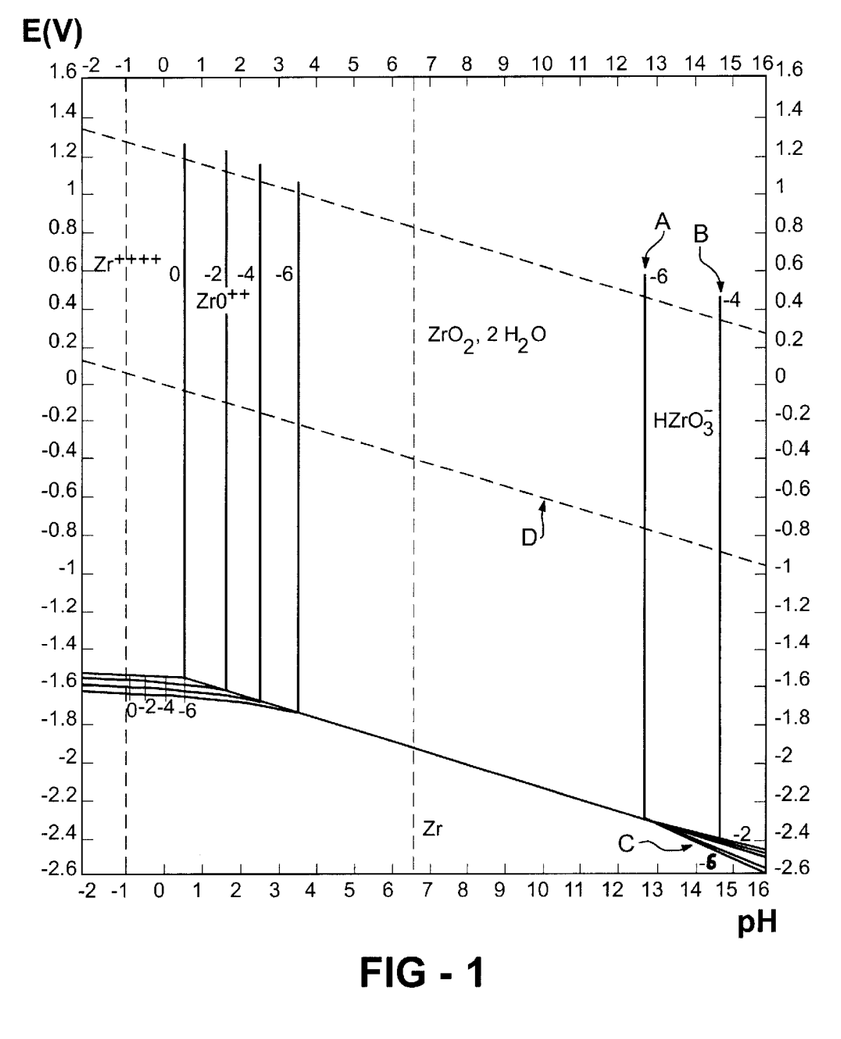
FIG. 1 is the potential-pH equilibrium diagram for the system zirconium-water at 25° C.

While not wishing to be bound by theory, it is believed that the increased surface area of the hydrogen storage alloy is due, at least in part, to an increase in the solubility of the metal oxides with the increased pH of the alkaline solution used to perform the alkaline etch treatment of the present invention. Generally, the solubility of a metal oxide in an alkaline solution increases with the pH of the solution. This may be seen by referring to FIG. 1 which shows the potential-pH equilibrium diagram for the system zirconium-water at 25° C. The dissolution of zirconium oxide $ZrO_2$ (zirconia) into zirconate ions $HZrO_3^-$ may be expressed by the chemical reaction (6):

$$ZrO_2 + OH^- \rightarrow HZrO_3^- \tag{6}$$

Increasing the concentration of an alkali metal hydroxide, such as potassium hydroxide, in the alkaline solution increases the OH⁻ concentration in the solution, driving reaction (6) to the right and increasing the dissolution of the oxide. Lines A and B of FIG. 1 are the pH-potential equilibrium lines corresponding to the dissolution of the zirconium oxide (as expressed by reaction (6)). They show that the solubility of zirconia increases with pH. (For example, increasing the weight percentage of the alkali metal hydroxide from about 30 weight percent to about 60 weight percent increases the pH of the alkaline solution by about 0.3 pH units, doubling the solubility of the zirconium oxide).

The increase in pH of the alkaline solution increases the solubility of the zirconium oxide and removes more of the soluble oxide components from the surface of the alloy, thereby increasing its porosity and surface area. The increase in pH also removes some of the less soluble oxide components (i.e., oxides such as titanium oxide and chromium oxide that were negligibly soluble in a 30 weight percent KOH solution), thereby further increasing the porosity and surface area as well as causing changes in the composition of the oxide layer.

Again, while not wishing to be bound by theory, it is further believed that the increased surface area of the hydrogen storage alloy is also due to increased electrochemical corrosion of the unoxidized metal species of the hydrogen storage alloy. For example, the corrosion of zirconium metal to zirconate ions $HZrO_3^-$ may be expressed as the electrochemical oxidation-reduction reaction (7):

$$Zr + OH^- + 2H_2O \rightarrow HZrO_3^- + 2H_2(gas) \quad (7)$$

As seen from reaction (7), the oxidation of zirconium metal to zirconate ions $HZrO_3^-$ is accompanied by the reduction of hydrogen ions to hydrogen gas.

The oxidation-reduction reaction (7) may be written as two separate reactions (7a) and (7b) for the oxidation of zirconium metal and the reduction of hydrogen ions, respectively:

$$Zr + 5OH^- \rightarrow HZrO_3^- + 2H_2O + 4e^- \quad (7a)$$

$$4H_2O + 4e^- \rightarrow 2H_2(gas) + 4OH^- \quad (7b)$$

The standard electrode potential $E^o$ of the oxidation reaction (7a) is measured relative to the potential of the standard hydrogen electrode reaction (7b). Generally, metals which are more reactive than hydrogen are assigned negative values of $E^o$ and are said to be "anodic" to hydrogen. Furthermore, the larger the negative potential relative to hydrogen, the more reactive the metal.

With this in mind, the reader is again referred to FIG. 1. Line C is the pH-potential equilibrium line corresponding to the oxidation half-cell reaction (7a) of zirconium metal to zirconate ions $HZrO_3^-$. Line D is the pH-potential line corresponding to the reduction half-cell reaction (7b) of hydrogen ions to hydrogen gas.

As may be observed, at sufficiently high values of pH, increases in the pH makes the potential of the oxidation reaction (7a) more negative relative to the reduction reaction (7b) so that zirconium metal becomes more reactive relative to hydrogen. Hence, increases in pH increases the corrosion of the zirconium metal (oxidation reaction 7a) as well as the evolution of hydrogen gas (reduction reaction 7b). Increased evolution of hydrogen gas increases hydrogen gas pressure. This causes greater penetration of the hydrogen gas into the hydrogen storage alloy resulting in cracking and breakage of the alloy particles and increasing the surface area of the material. The penetration of the hydrogen gas into the hydrogen storage alloy also causes partial charging of the alloy. (For example, increasing the alkali metal hydroxide concentration, such as KOH, from about 30 wt % to about 60 wt % increases the pH of the alkaline solution by about 0.3 pH units. This increases the potential difference between the two half-cell reactions (7a) and (7b) by about 30 mV and increases the evolution of hydrogen gas sufficiently to increase the hydrogen gas pressure by about a factor of ten).

It is noted that an alkali metal hydroxide concentration below about 40 weight percent does not provide for a sufficient increase in either the dissolution of the metal oxide species nor the corrosion of the metal to significantly affect the surface area of either the hydrogen absorbing alloy or hydrogen absorbing alloy electrode. As well, an alkali metal hydroxide concentration above about 70 wt % may be undesirable since they may be difficult to dissolve such a high concentration of alkali metal hydroxide without further increases in temperature. Hence, it is preferable that the alkali metal hydroxide concentration is below about 70 wt %, and more preferably that the alkali metal hydroxide concentration is below about 65 wt %.

EXAMPLE 1

Alloy Activation/BET Analysis

A sample of a hydrogen storage alloy powder having the composition $Zr_{26.6}Ti_9V_5Cr_5Mn_{16}Ni_{38}Sn_{0.4}$ is subjected to an alkaline etch treatment by being immersed in a 30 wt % KOH aqueous solution, at about 110° C., for a time period of about four and one-half hours. A second sample of the same alloy powder is immersed in a 45 wt % KOH aqueous solution, at about 110° C., for about three hours. A third sample of the same alloy powder is immersed in a 60 wt % KOH aqueous solution, at about 110° C., for about two hours. The Samples are separated from the KOH solutions, rinsed with deionized water, and dried.

The surface area of the powders are measured using BET analysis. The BET results are shown in Table 1 for the 30 wt %, 45 wt %, and 60 wt % alkaline etch treatments. It is noted that the surface areas listed in the table are achieved without any electrochemical cycling.

TABLE 1

POWDER SURFACE AREA (BET MEASUREMENT) ALKALINE ETCH TREATMENT WITHOUT ELECTROCHEMICAL CYCLING

| % Wt KOH | Temp | Time | BET Surface Area |
| --- | --- | --- | --- |
| 30% | 110° C. | 4.5 hr | 3.2 m²/g |
| 45% | 110° C. | 3.0 hr | 5.9 m²/g |
| 60% | 110° C. | 2.0 hr | 6.3 m²/g |

EXAMPLE 2

Electrode Activation/BET Analysis

Samples of the same hydrogen storage alloy used in Example 1 are compacted onto conductive substrates to form electrodes. A first electrode is subjected to the alkaline etch treatment at a 30 wt % KOH solution, at a temperature of about 110° C., for a time period of about four and one-half hours. A second electrode is subjected to the alkaline etch treatment at a 45 wt % KOH solution, at a temperature of about 110° C., and for a time period of about three hours. A third electrode is subjected to the alkaline etch treatment at 60 wt % percent KOH solution, at a temperature of about 110° C., for a time period of about two hours. No electrochemical charge-discharge cycling is performed on any of the electrodes.

The following Table 2 summarizes the time period, temperature, and percent weight KOH used to activate the negative electrodes. Also shown is the BET surface area measurement for each of the electrodes.

TABLE 2

ELECTRODE SURFACE AREA (BET MEASUREMENT) ALKALINE ETCH TREATMENT WITHOUT ELECTROCHEMICAL CYCLING

| % Wt KOH | Temp | Time | BET Surface Area |
| --- | --- | --- | --- |
| 30% | 110° C. | 4.5 hr | 2.1 m$^2$/g |
| 45% | 110° C. | 3.0 hr | 2.6 m$^2$/g |
| 60% | 110° C. | 2.0 hr | 6.7 m$^2$/g |

The results of Table 1 and Table 2 show that the BET surface area of the hydrogen storage alloy as well as the BET surface area of the hydrogen storage alloy electrode may be significantly increased without the use of any electrochemical cycling by increasing the alkali metal hydroxide concentration in the alkaline solution. The surface area results shown in Tables 1 and 2 are especially surprising given that the increases in the surface area are achieved with reduced activation times. Hence, the alkaline etch treatment of the present invention provides for a more effective activation process (i.e., the hydrogen absorbing alloy material and hydrogen absorbing alloy electrode have higher surface areas) as well as a more efficient activation process (i.e., the process is completed in less time).

Furthermore, the results from Table 1 show that hydrogen storage alloys with a surface area greater than about 4 square meters per gram may be achieved without any electrochemical cycling by using the alkaline etch treatment of the present invention. Preferably, hydrogen storage alloys having a surface area greater than about 5 square meters per gram may be achieved without any electrochemical cycling. More preferably, hydrogen storage alloys having a surface area greater than about 6 square meters per gram may be achieved without any electrochemical cycling.

As well, the results from Table 2 show that a hydrogen absorbing alloy electrode with a surface area greater than with a surface area greater than about 4 square meters per gram may be achieved without any electrochemical cycling by using the alkaline etch treatment of the present invention. Preferably, hydrogen storage alloy electrode having a surface area greater than about 5 square meters per gram may be achieved without any electrochemical cycling. More preferably, hydrogen storage alloy electrode having a surface area greater than about 6 square meters per gram may be achieved without any electrochemical cycling.

Electrochemical cycling is used by battery manufacturers to increase the surface area of the hydrogen storage alloys and hydrogen storage alloy electrodes. During the electrochemical cycling process the electrode is charged and discharged for a predetermined number of cycles. Charging and discharging the electrode forces the absorption and desorption of hydrogen atoms by the hydrogen storage alloy. This causes expansion and contraction of the alloy which induces stress and forms cracks within the alloy material. The cracking increases the surface area and porosity of the alloy material.

The electrochemical cycling process generally involves a relatively complex procedure of cycling the electrochemical cell through a number of charge/discharge cycles at varying charge/discharge rates for certain times. The cycling process puts an additional burden on commercial battery manufacturers by requiring the manufacturers to purchase equipment in the form of battery chargers and also requires the cost of labor and utilities to run the equipment. The alkaline etch treatment of the present invention provides a method of substantially increasing the surface area and performance of hydrogen storage alloys and hydrogen storage electrodes without the need to perform electrochemical cycling. Hence, higher performance materials,. electrodes and batteries may be manufactured faster and less expensively.

EXAMPLE 3

Electrode Activation/AC Impedance Analysis

The surface area of the alloy and electrode presented in Tables 1 and 2 above were measured using BET analysis. The surface area of the electrode may also be calculated from AC impedance analysis. In general, the AC impedance of an electrode is a nyquist plot showing the real portion of electrode impedance on the horizontal axis and the imaginary portion of electrode impedance on the vertical axis. The impedances are typically plotted as a function of a range of frequencies starting at a high frequency of about 10 kHz and going to a low frequency of about 20 uHz. The double layer capacitance $C_{dl}$ of the electrode, calculated from the AC impedance plot, may be used to determine the surface area of the electrode.

A hydrogen absorbing alloy having the composition $Zr_{26.6}Ti_9V_5Cr_5Mn_{16}Ni_{38}Sn_{0.4}$ (the same as Examples 1 and 2) is made into a powder and compacted onto an expanded metal substrate to form a hydrogen absorbing alloy negative electrodes. The negative electrodes are activated by immersing the electrodes in hot KOH solutions at various KOH concentrations, temperatures and times.

In a first experiment, a set of three electrodes is activated at 100° C. A first electrode is activated at 30 wt % KOH for 4½ hours, a second electrode is activated at 45 wt % KOH for 3 hours, and a third electrode is activated at 60 wt % for 2 hours.

In a second experiment, a set of three electrodes is activated at 110° C. A first electrode is activated at 30 wt % for 4½ hours, 45 wt % for 3 hours, and 60 wt % for 2 hours. Each of the electrodes is tested in a negative limited tri-electrode cell with nickel hydroxide positive electrodes.

The values of $C_{dl}$ are measured for each of the electrodes and the corresponding electrode surface areas are calculated. The results are shown in Table 3 for the three electrodes activated at 100° C. and for the three electrodes activated at 110° C. To calculate the surface area from the double layer capacitance $C_{dl}$, a specific capacitance of 25 uF/cm$^2$ is assumed. It is noted that no electrochemical cycling was performed on any of the electrodes. It is further noted that the AC impedance analysis is performed at 80% state of charge.

TABLE 3

ELECTRODE SURFACE AREA (AC IMPEDANCE ANALYSIS) ALKALINE ETCH TREATMENT WITHOUT ELECTROCHEMICAL CYCLING

| Wt % KOH | Temp | Time | $C_{dl}$ | Surface Area |
| --- | --- | --- | --- | --- |
| 30% | 100° C. | 4.5 hr | .17 farad/gram | 0.7 m$^2$/gram |
| 45% | 100° C. | 3.0 hr | .32 farad/gram | 1.3 m$^2$/gram |
| 60% | 100° C. | 2.0 hr | 1.0 farad/gram | 4.0 m$^2$/gram |
| 30% | 110° C. | 4.5 hr | .33 farad/gram | 1.3 m$^2$/gram |
| 45% | 110° C. | 3.0 hr | .59 farad/gram | 2.4 m$^2$/gram |
| 60% | 110° C. | 2.0 hr | 2.0 farad/gram | 8.0 m$^2$/gram |

The surface areas calculated using AC impedance analysis results (i.e., the results shown in Table 3) are consistent with the BET measurements of Table 2. The results of Table 3 show that the surface area of an activated hydrogen absorbing alloy electrode increases with the alkali metal hydroxide concentration of the alkaline solution used to perform the alkaline etch treatments. Moreover, the results show that the surface area of the electrodes increase even though the time of activation is decreased. (It is also noted that the surface area increases with temperature when both the time of activation and the KOH concentration are kept constant).

The increase in surface area of the hydrogen absorbing alloy electrode provides for significantly improved electrochemical properties of the electrode. Certain electrochemical properties are directly dependant upon surface areas.

Rate Capability

The rate capability of the electrode is a measure of the electrode capacity (mAh/g) as a function of the discharge rate (mA/g). The rate capability depends upon the diffusion coefficient of the hydrogen species through the bulk of the active electrode material as well as the "apparent thickness" of the active material. Increasing the surface area of the electrode (as hence, of the active electrode material) decreases the materials apparent thickness resulting in a improved rate capability.

Figure 2:
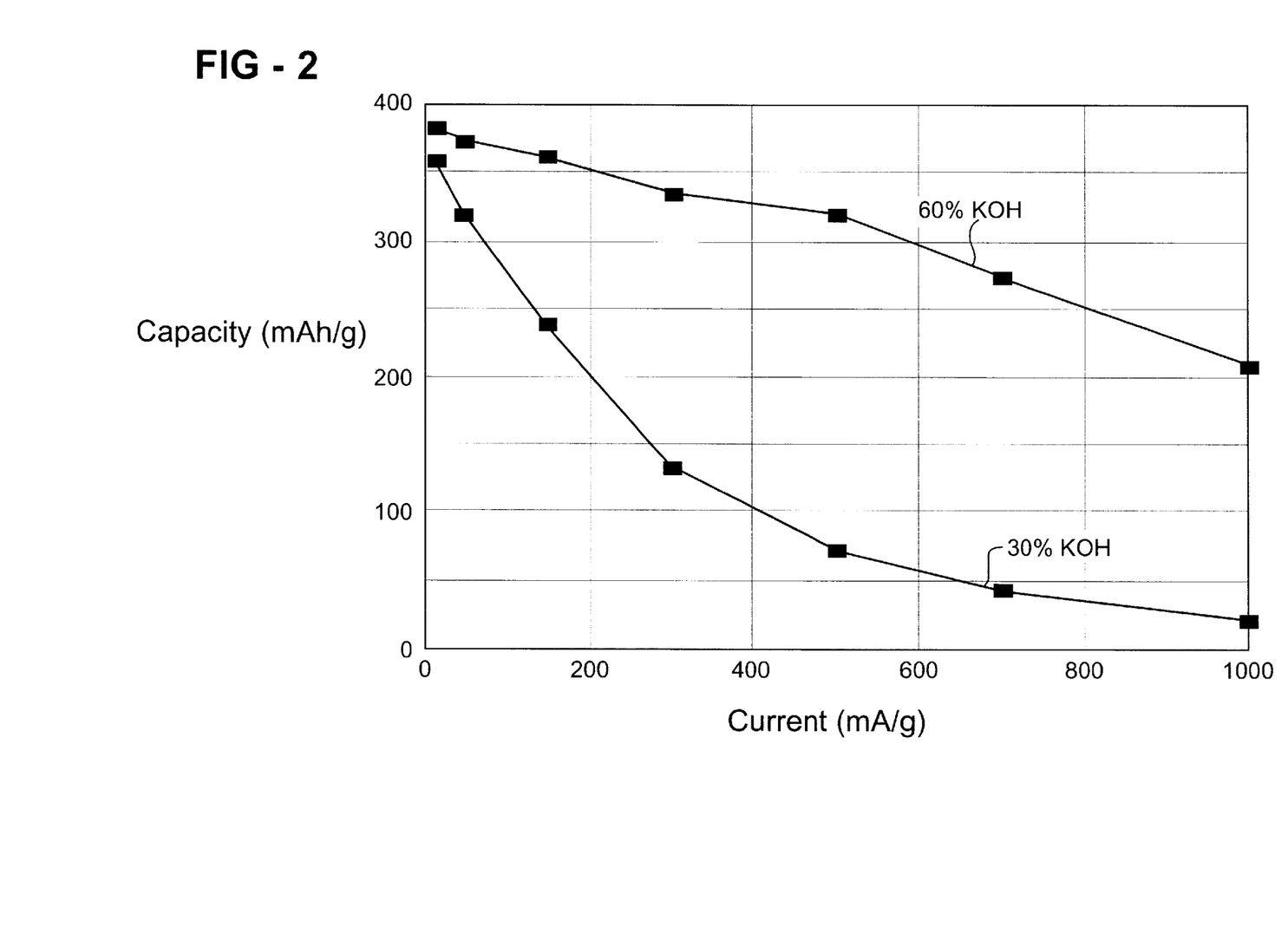
FIG. 2 shows rate capability curves for electrodes activated at a temperature of 100° C. at 30 weight percent KOH and 60 weight percent KOH.
Figure 3:
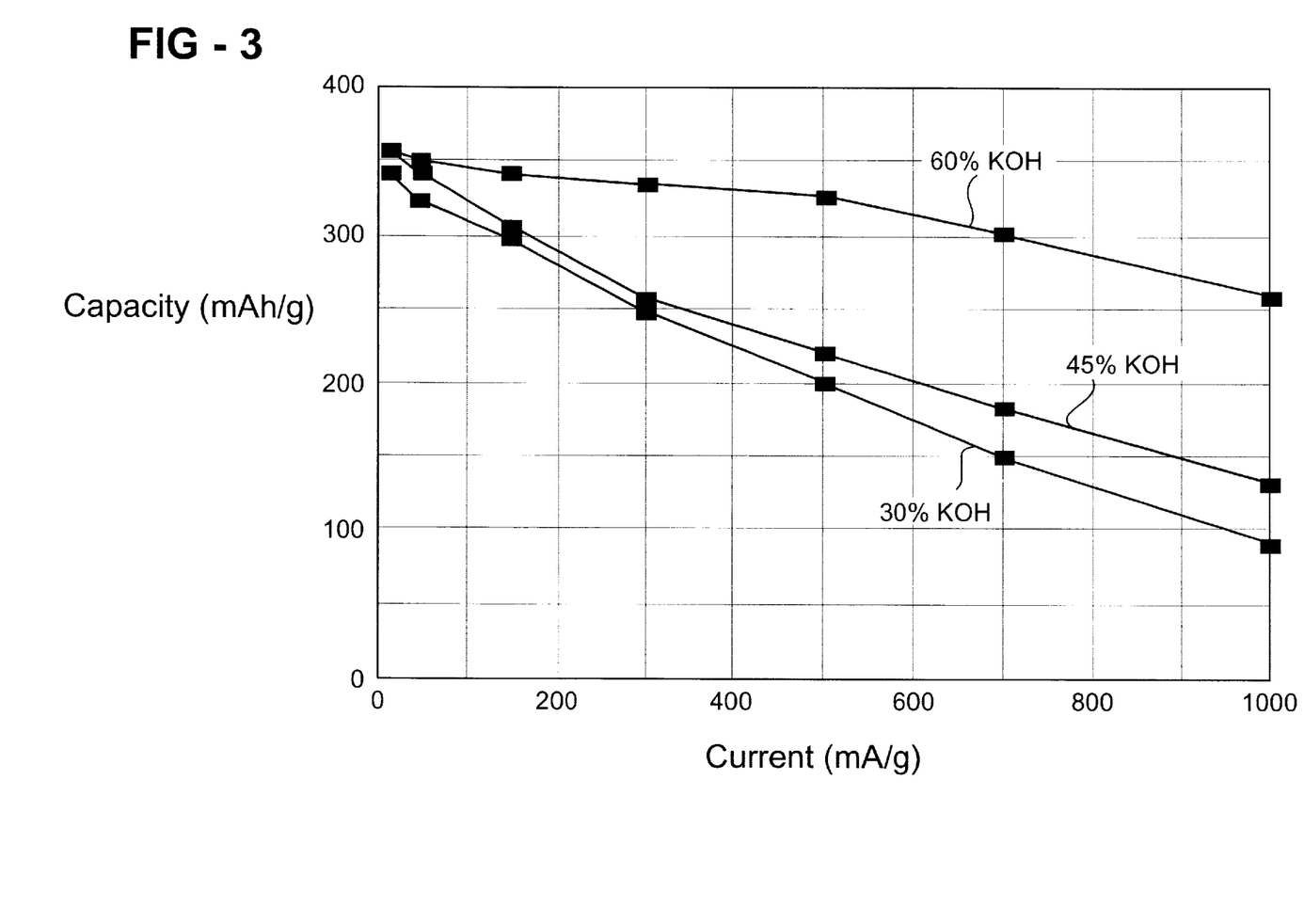
FIG. 3 shows rate capability curves for electrodes activated at a temperature of 110° C. at 30 weight percent KOH, 45 weight percent KOH and 60 weight percent KOH.

FIG. 2 shows the rate capability of the set of electrodes activated at 100° C. The results are shown for the alkaline etch at 30 wt % KOH and at 60 wt % KOH. FIG. 3 shows the rate capability for the set of electrodes activated at 110 ° C. The results are shown for the alkaline etch at 30 wt %, 45 wt %, and 60 wt %. The results of both FIGS. 2 and 3 show that rate capability improves with increased KOH concentration (from 30 wt % to 45 wt %, and from 45 wt % to 60 wt %).

Limiting Current $I_1$

The limiting current $I_1$ is the maximum current obtainable from the electrode. Like the rate capability, the limiting current $I_1$ is a function of the diffusion coefficient of the active material as well as the surface area of the material. Hence, increasing the surface area of the hydrogen absorbing alloy electrode increasing the limiting current $I_1$. The limiting current was measured for the electrodes of Example 3 above at 80% state of charge. Table 4 below shows values of limiting current $I_1$ for the hydrogen absorbing alloy electrodes etched using 30 wt % KOH (for 4.5 hours), 45 wt % KOH (for 3.0 hours), and 60 wt % KOH (for 2.0 hours). Results are shown for both 100° C. and 110 ° C.

TABLE 4

LIMITING CURRENT $I_1$

| Wt % KOH | Temp | Time | $I_1$ |
|---|---|---|---|
| 30% | 100° C. | 4.5 hr | .58 amps/gram |
| 45% | 100° C. | 3.0 hr | not measured |
| 60% | 100° C. | 2.0 hr | .84 amps/gram |
| 30% | 110° C. | 4.5 hr | .83 amps/gram |
| 45% | 110° C. | 3.0 hr | 1.7 amps/gram |
| 60% | 110° C. | 2.0 hr | 2.3 amps/gram |

The results of Table 4 shows that the limiting current increases with increased KOH concentration (i.e., from 30 wt % to 45 wt % and from 45 wt % to 60 wt %).

An embodiment of the activation processes of the present invention is an alkaline etch treatment using an alkali metal hydroxide concentration within the range from about 40 weight percent to about 70 weight percent and which also maximizes the limiting current of the electrode.

Charge Transfer Resistance $R_{ct}$

The charge transfer resistance $R_{ct}$ is directly proportional to the diameter of the high frequency semicircle of the AC impedance plot. The charge transfer resistance $R_{ct}$ is measure of the surface kinetics of the hydrogen absorbing alloy electrode. The surface kinetics depends on both the catalytic properties of the elctrode active material as well as the electrode surface area. Table 5 shows the values of the charge transfer resistance $R_{ct}$ for the electrodes of Example 3.

TABLE 5

CHARGE TRANSFER RESISTANCE $R_{ct}$

| Wt % KOH | Temp | Time | $R_{ct}$ |
|---|---|---|---|
| 30% | 100° C. | 4.5 hr | .51 ohms-gram |
| 45% | 100° C. | 3.0 hr | .15 ohms-gram |
| 60% | 100° C. | 2.0 hr | .15 ohms-gram |
| 30% | 110° C. | 4.5 hr | .17 ohms-gram |
| 45% | 110° C. | 3.0 hr | .12 ohms-gram |
| 60% | 110° C. | 2.0 hr | .18 ohms-gram |

The results of Table 5 shows that the charge transfer resistance decreases from 30 wt % KOH to 45 wt % KOH.

An embodiment of the activation processes of the present invention is an alkaline etch treatment using an alkali metal hydroxide concentration within the range from about 40 weight percent to about 70 weight percent and which also minimizes the charge transfer resistance of the electrode. In another embodiment, the concentration may preferably be chosen between about 40 weight percent and about 50 weight percent, more preferably between about 42 weight percent and about 48 weight percent, most preferably between about 43 weight percent and about 47 weight percent.

While the present invention has been described with respect to specific embodiments thereof, it will be understood that various changes and modifications may be made within the scope and spirit of the invention and it is intended that the invention encompass such changes and modifications as fall within the scope of the appended claims.

We claim:

1. A method of activating a hydrogen storage alloy, comprising the step of:

contacting said hydrogen storage alloy with an aqueous solution of an alkali metal hydroxide having a concentration of at least 50 weight percent.

2. The method of claim 1, wherein the concentration of said alkali metal hydroxide is between 50 weight percent and 70 weight percent.

3. The method of claim 2, wherein the concentration of said alkali metal hydroxide is between 55 weight percent and 65 weight percent.

4. The method of claim 1, wherein the concentration of said alkali metal hydroxide is greater than the concentration dissolvable at room temperature.

5. The method of claim 1, wherein said alkali metal hydroxide is chosen from the group consisting of potassium hydroxide, sodium hydroxide, lithium hydroxide, and mixtures thereof.

6. The method of claim 1, wherein said contacting step is performed for a time period between 1 and 5 hours.

7. The method of claim 1, wherein said contacting step is performed at a temperature is at least 60° C.

8. The method of claim 1, wherein said contacting step is performed at a temperature of at least 80° C.

9. The method of claim 1, wherein said contacting step is performed at a temperature of at least 100° C.

10. A method of activating a hydrogen storage alloy electrode for an alkaline electrochemical cell, comprising:

contacting said electrode with an aqueous solution of an alkali metal hydroxide having a concentration of at least 42 weight percent.

11. The method of claim 10, wherein the concentration of said alkali metal hydroxide is between 42 weight percent and 48 weight percent.

12. The method of claim 10, wherein the concentration of said alkali metal hydroxide is between 50 weight percent and 70 weight percent.

13. The method of claim 10, wherein the concentration of said alkali metal hydroxide is between 55 weight percent and 65 weight percent.

14. The method of claim 10, wherein the concentration of said alkali metal hydroxide is greater than the concentration dissolvable at room temperature.

15. The method of claim 10, wherein said contacting step is performed before said electrode is sealed in said electrochemical cell.

16. The method of claim 10, wherein said contacting step is performed after said electrode is sealed in said electrochemical cell.

17. The method of claim 10, wherein said alkali metal hydroxide is chosen from the group consisting of potassium hydroxide, sodium hydroxide, lithium hydroxide, and mixtures thereof.

18. The method of claim 10, wherein said contacting step is performed for a time period between 1 and 5 hours.

19. The method of claim 10, wherein said contacting step is performed at a temperature is at least 60° C.

20. The method of claim 10, wherein said contacting step is performed at a temperature at least 80° C.

21. The method of claim 10, wherein said contacting step is performed at a temperature at least 100° C.

22. The method of claim 10, wherein the concentration of said alkali metal hydroxide is at least 43 weight percent.

23. The method of claim 10, wherein the concentration of said alkali metal hydroxide is at least 45 weight percent.

24. A method of activating a hydrogen storage alloy, comprising the step of:

contacting said hydrogen storage alloy with an aqueous alkaline solution having a hydroxide ion concentration of at least 13.388 M.

25. The method of claim 24, wherein said aqueous alkaline solution comprises an alkali metal hydroxide.

26. The method of claim 25, wherein said alkali metal hydroxide comprises at least one component selected from the group consisting of potassium hydroxide, sodium hydroxide and lithium hydroxide.

27. The method of claim 24, wherein said contacting step is performed for a time period between about 1 and about 5 hours.

28. The method of claim 24, wherein said contacting step is performed at a temperature of at least 60° C.

29. The method of claim 24, wherein said contacting step is performed at a temperature of at least 80° C.

30. The method of claim 24, wherein said contacting step is performed at a temperature of at least 100° C.

31. A method of activating a hydrogen storage alloy electrode, comprising:

contact said electrode with an aqueous alkaline having a hydroxide ion concentration of at least 10.558 M.

32. The method of claim 31, wherein said hydroxide ion concentration is at least 13.388 M.

33. The method of claim 31, wherein said aqueous alkaline solution comprises an alkali metal hydroxide.

34. The method of claim 33, wherein said alkali metal hydroxide comprises at least one component selected from the group consisting of potassium hydroxide, sodium hydroxide and lithium hydroxide.

35. The method of claim 31, wherein said contacting step is performed for a time period between about 1 and about 5 hours.

36. The method of claim 31, wherein said contacting step is performed at a temperature of at least 60° C.

37. The method of claim 31, wherein said contacting step is performed at a temperature of at least 80° C.

38. The method of claim 31, wherein said contacting step is performed at a temperature of at least 100° C.

39. The method of claim 31, wherein said contacting step is performed before said electrode is sealed in an electrochemical cell.

40. The method of claim 31, wherein said contacting step is performed after said electrode is sealed in an electrochemical cell.

* * * * *